June 13, 1972     3,669,528

DEVICE FOR PRODUCING IDENTIFIABLE SINE AND COSINE
(FOURIER) TRANSFORMS OF INPUT SIGNALS
BY MEANS OF NONCOHERENT OPTICS

Filed July 8, 1971     12 Sheets-Sheet 1

INVENTOR.
JOHN M. RICHARDSON,
BY
Eric S. Chung
ATTORNEY

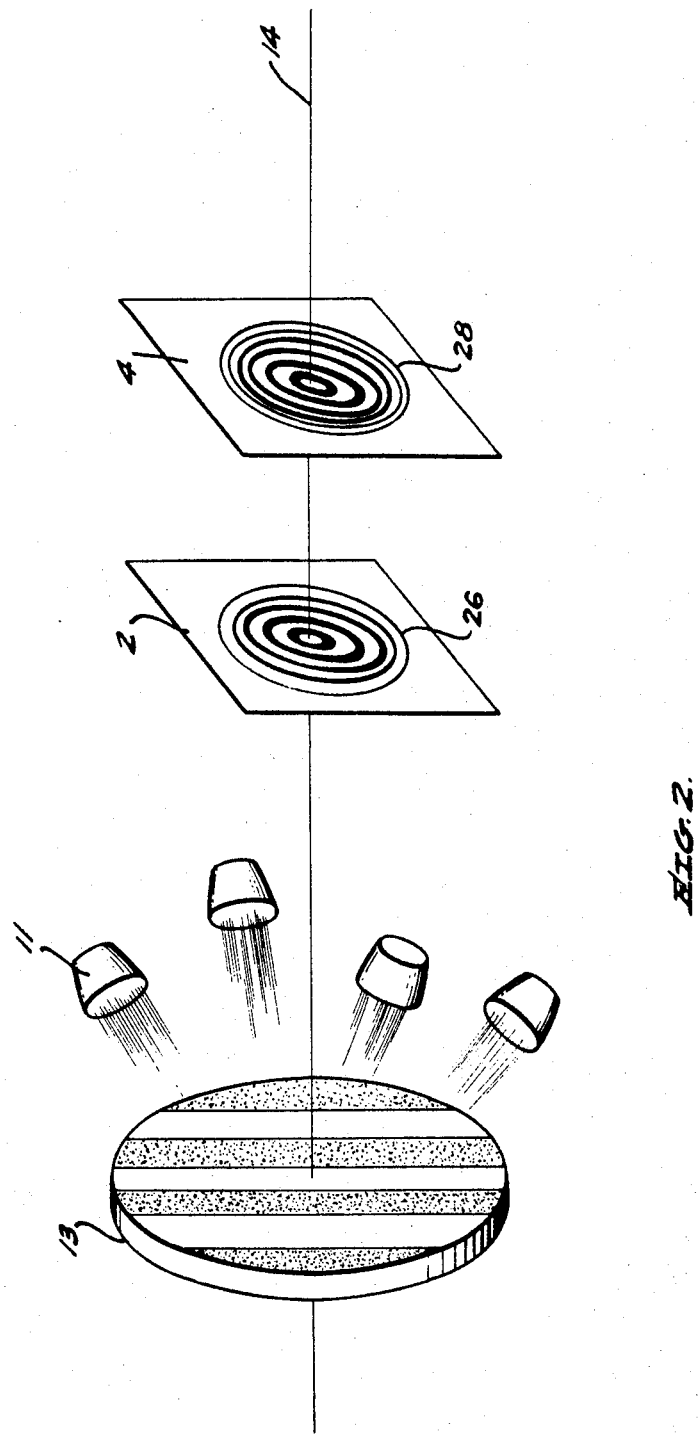

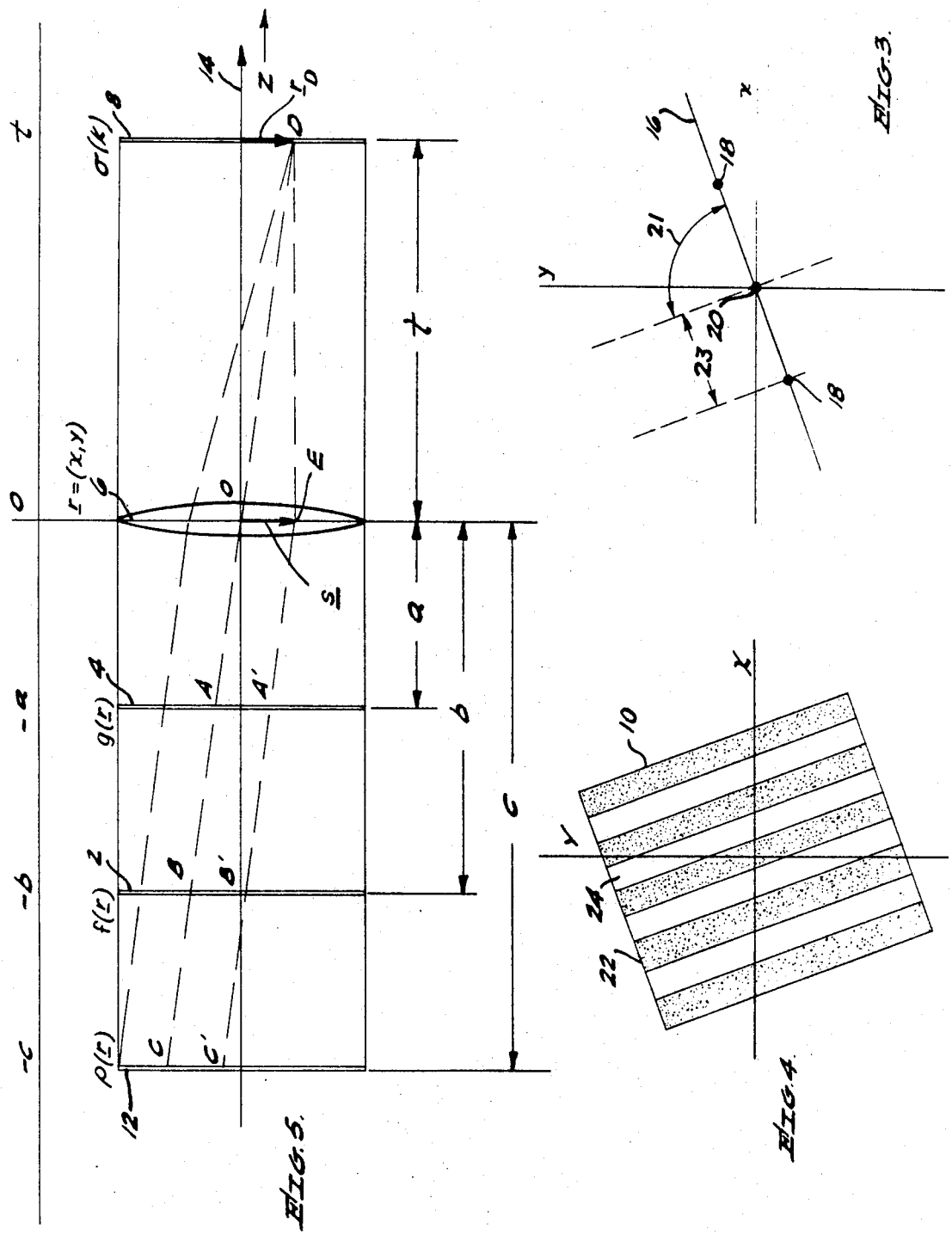

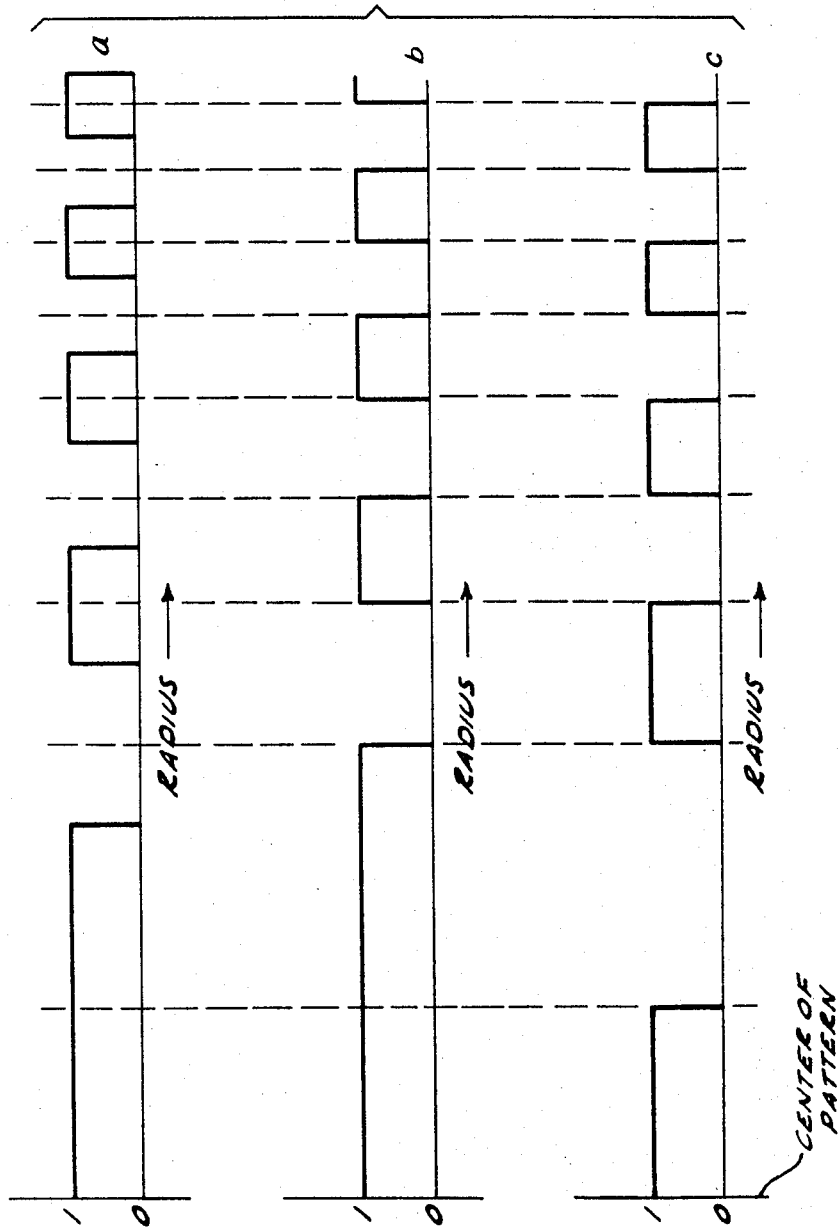

3,669,528
DEVICE FOR PRODUCING IDENTIFIABLE SINE AND COSINE (FOURIER) TRANSFORMS OF INPUT SIGNALS BY MEANS OF NONCOHERENT OPTICS

John M. Richardson, Malibu, Calif., assignor to Hughes Aircraft Company, Culver City, Calif.
Continuation-in-part of abandoned application Ser. No. 770,230, Oct. 24, 1968. This application July 8, 1971, Ser. No. 160,852
Int. Cl. G02b 27/38
U.S. Cl. 350—205
13 Claims

ABSTRACT OF THE DISCLOSURE

Fourier transforms are produced on an output plane when input images are projected by means of spatially incoherent light through a pair of transparencies each having a Fresnel zone pattern thereon. The system is designed to operate as close to the geometrical optics limit as is practically feasible.

---

This application is a continuation-in-part of copending patent application, Ser. No. 770,230, filed Oct. 24, 1968, entitled "Optical Transformer," now abandoned.

The present invention relates to optical systems for producing Fourier transforms of light images and, in particular, for producing either identifiable sine transforms or identifiable cosine transforms of input images using noncoherent optics.

Fourier transforms for purposes of this disclosure are represented mathematically as a complex function having a real portion (i.e., cosine transform) and an imaginary portion (i.e., sine transform). This complex function serves to define the spatial frequency content of an input image.

Physically, a cosine transform, for example, in accordance with the present invention, takes the form of output light signals produced on an output or transform plane by projecting spatially incoherent light from an extended source of light through a pair of Fresnel zone plates towards the output or transform plane. The sine transform is produced in a similar manner with a modification, of the Fresnel zone plates. For both the sine and cosine transforms, the spatially incoherent light is modulated by an input pattern or the like to provide input light images of spatially incoherent light and to produce output signals on the output plane corresponding to the transformed input images. The input image pattern may be placed in any optical position between the source of the incoherent light and the output planes, i.e., before, after, or in between the Fresnel zone plates; however, for purposes of simplifying the description of the present invention, the primary exposition thereof shall be concerned with the specific embodiment where the spatially incoherent light as modulated by the input images are projected through both Fresnel zone plates. Nevertheless, it is to be understood that the mathematical explanation and results of the present invention do not change upon a change in the placement of the input image pattern.

As an example, as a result of using an input light image produced from the modulation of the spatially incoherent light by the illustrative configuration of a graphic bar pattern, which comprises a plurality of uniformly spaced opaque bars arranged in a spaced parallel relationship, the cosine transform of the input bar pattern light image takes the form of conjugate loci embodied as a pair of spaced circular zones or dots which correspond to the fundamental spatial frequency of the input light image. These circular zones or dots appear on the output plane and are equally spaced from the center point of the output plane on an imaginary straight line which extends through the center point and which is rotated 90° from the input bar pattern image.

The distance of the circular zones or dots from the center of the transform plane is dependent on the spatial frequency of the bars of the input light image. Consequently, as the spatial frequency of the graphic bar pattern image is increased, that is, as the width of the bars or as the distance between bars is increased, the distance from each of the circular zones to the center of the output plane is proportionately increased.

The orientation of the imaginary straight line extending through the conjugate loci and the center point of the output plane is dependent on the orientation of the bars forming the graphic pattern of the input light image. As stated above, this imaginary straight line will always be orthogonal to the bars.

Because the bar pattern image is composed of the superposition of many sinusoidal patterns, representing the fundamental spatial frequency and its "harmonics," additional circular zones or dots of much weaker intensity and corresponding to the harmonics will appear on the same imaginary straight line.

In the prior art, coherent light has been passed through a single Fresnel zone plate in such a manner as to cause the Fresnel zone to act as a lens. The light images thereby produced may be superficially compared to those produced by the present invention but, in reality, are quite different because their production results from the use of diffraction techniques based upon Fraunhofer, coherent optics principles. Diffraction techniques are generally more expensive, cumbersome, and difficult to use due to the critical parameters of the required components. Diffraction techniques require the use of monochromatic light which is projected through the combination of a transparency capable of forming the input image and a lens to produce the desired output image. When the input image is formed as a bar pattern, the transparency comprises a diffraction grating. All operations employing diffraction phenomena require critical dimensional control of the optical components used.

Conceptually, the present invention differs from prior art diffraction techniques in that the output images of the present invention are not produced by diffraction of coherent light but by obstruction of noncoherent light. While an output image produced by diffraction may be mathematically described as the spatial power spectrum of the input image, which is the sum of the squares of the sine and cosine transforms, in the present invention these transforms are individually and directly produced as distributions of light intensity in the output plane. To accomplish these results of the present invention, diffraction effects are minimized, rather than utilized to their fullest extent, since they would seriously interfere with its performance so as to make it inoperative.

Structurally, the present invention is not restricted by the use of components having critical parameters and, thus, provides greater versatility at less expense as compared to diffraction techniques. For example, the present invention does not require the use of monochromatic light, as required by diffraction techniques, but instead permits the use of polychromatic or white light. Further, as distinguished from diffraction techniques, neither a miniature light source nor a flat transparent grating are required. Thus, the present invention can use large light sources, such as extended sources of light, e.g., spotlighting or sunlight, which provide the required diffuse spatially incoherent light and which have an appropriately wide aperture, therefore allowing for greater light intensity. Additionally, the input image or signal can be presented in a variety of convenient formats, for example, an opaque copy, transparency, television screen, optical image, reflection, etc.

Briefly described, the present invention involves an optical system for producing Fourier transformer (i.e., cosine and sine transforms) of input images on an output plane when spatially incoherent light is projected through a pair of Fresnel zones and through the input images. As indicated above, the input images may be optically positioned at any place between the source of spatially incoherent light and the output plane.

More particularly, these transforms are produced, in accordance with one embodiment of the invention, by projecting preselected input light images, provided by spatially incoherent light passing through an input transparency, reflecting element or other suitable device, through a pair of axially aligned transforming Fresnel zone transparencies and focusing the output image emanative from the Fresnel zone transparencies on an output plane which is also axially aligned with the transforming Fresnel zone transparencies. The output image is the signal corresponding to the cosine or sine transform of the input image. When the input image is specifically configured as a bar pattern image, the transform of the bar image will consist of conjugate loci embodied as two circular zones or dots (neglecting harmonics) that are equidistant from the axis and that lie on an imaginary radial line perpendicular to the parallel bars of the input bar pattern image. More complex input images will yield correspondingly more complex output images in the transform plane, but in every case, the output image will be either the sine or the cosine transform of the input image, regardless of whatever configuration they may take.

It is, therefore, an object of the present invention to provide a means for producing identifiable sine and cosine transforms of input light images.

Another object is to provide such a means operable as close as possible to the geometrical optics limit as is practically feasible.

Another object is to provide a sine and cosine transformer using noncoherent optics.

Another object is to provide a sine and cosine transformer that is structurally simple and dimensionally noncritical.

Still another object is to provide an optical implementation of a sine and cosine transformer that permits the use of polychromatic light.

These and other objects and many of the attendant advantages of the present invention will be more readily appreciated as the same becomes better understood by reference to the following exemplary detailed description which is to be considered in connection with the accompanying drawings in which like reference symbols designate like parts throughout the figures thereof and wherein:

FIG. 2 is a schematic diagram illustrating another method of providing an input light image, alternate to that of FIG. 1;

FIG. 3 is a graphical representation of an output image comprising the cosine transform of the input light image produced on an output plane in accordance with the present invention;

FIG. 4 is a graphical representation of an input image forming means which may be used in conjunction with the present invention for producing the output image depicted in FIG. 3;

FIG. 5 is a schematic diagram illustrating a cross-sectional side view of one embodiment of the invention useful in understanding a mathematical explanation thereof;

FIG. 6 depicts graphical representations a, b, and c which are useful in discussing a second embodiment of the present invention configured as a sine transformer;

Figure 1:
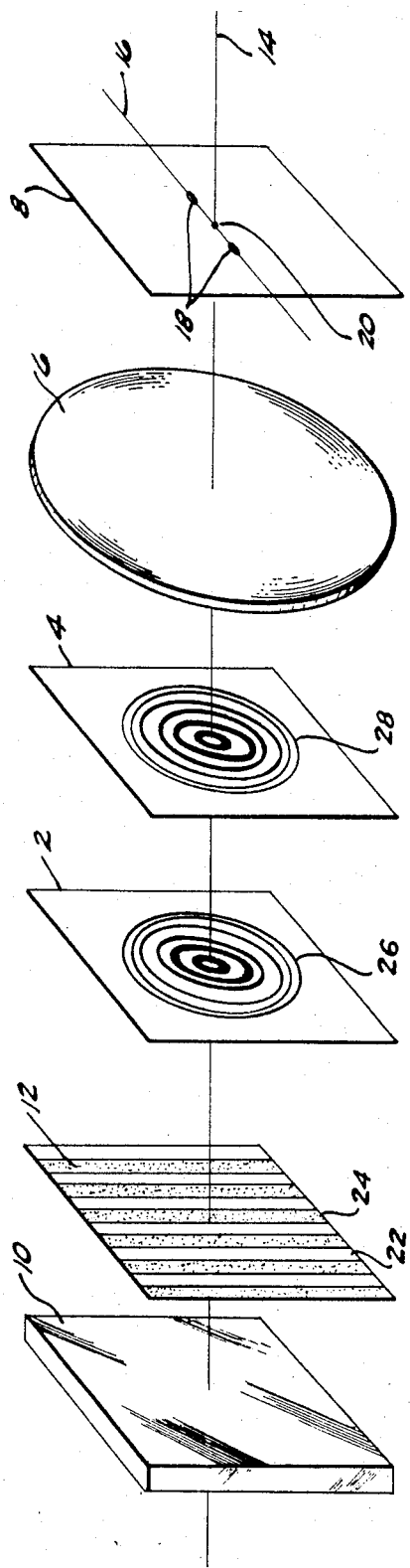
FIG. 1 is a schematic diagram illustrating one preferred embodiment of a cosine transformer.

Referring to FIG. 1, the system of the present invention includes a pair of transforming transparencies 2 and 4, a lens 6, if needed, and an output plane 8, all of which are respectively aligned along an axis 14 and arranged in a mutually parallel relationship. An extended source 10 of spatially incoherent light and an input image forming means 12 completes the system.

Each of the transforming transparencies has a Fresnel zone pattern therein. As is well known, a Fresnel zone pattern includes a plurality of concentric circles or rings wherein each successive circle has a radius proportional to the square root of successive integers starting with numeral "1" and wherein the alternate areas formed by adjacent circles are darkened to form a pattern of alternating opaque and transparent concentric rings. More generally, the circles or rings may have a radius proportional to the square root of successive integers from which a constant fractional quantity has been subtracted. For use in the present invention, however, there are certain limitations in the construction of the zone pattern, as will be more fully described hereinafter with reference to the mathematical explanations of the present invention. Qualitatively, the Fresnel zone patterns are so constructed as to minimize diffraction effects by increasing the focal length of each zone pattern far beyond output plane 8 and to make the Moiré errors of the combined zone patterns small.

As stated above, lens 6 is used, if needed. This requirement depends on the scaling of Fresnel zone patterns 26 and 28. If the zone patterns are identically scaled, the output image without lens 6 will form at infinity. To avoid this impractical result, lens 6 is included in the illustrated embodiment of FIG. 1 to converge the output image on output plane 8. Alternatively, this result can be obtained without the use of a converging lens if the rings of Fresnel zone patterns 26 and 28 on the transforming transparencies 2 and 4 are scaled in such a manner that the rings of zone pattern 26 are proportionately larger than the rings of zone pattern 28 to permit each set of parallel light rays converging on the center of output plane 8 to pass through corresponding rings of each of the Fresnel zone patterns. Otherwise stated, any one pencil beam of light of infinitely small diameter passing through the "$n$th" ring of zone pattern 26 also passes through the "$n$th" ring of zone pattern 28, where the former "$n$th" ring is further distanced from axis 14 than the latter "$n$th" ring. Since zone pattern 26 is of larger scale than zone pattern 28, all pencil beams for the corresponding rings of the two patterns form an imaginary cone having its apex at the center of the output plane.

Under conditions requiring the use of lens 6, the lens and the output plane are positioned in such a manner that each set of parallel rays entering the lens from an extended source of spatially incoherent light are focused on the output plane. Such light may comprise a diffuse source 10 of polychromatic light and the source is situated to project the light through an input image forming means 12, such as a mask or transparency containing graphic information, to modulate the light and to provide an input light image. It is to be understood, however, that, although input image forming means 12 is illustrated in FIG. 1 as having a graphic bar pattern formed from light and shaded bars 22 and 24, the input image forming means may have any desired pattern or contain any desired graphic information. As a consequence, more complex input patterns will yield correspondingly more complex output images on output or transform plane 8.

The arrangement illustrated in FIG. 2 illustrates an alternate input image forming means which is disposed as a reflective member 13 and which is illuminated by conventional light sources 11 of diffuse, spatially incoherent light. Therefore, this arrangement functions in a manner similar to mask or transparent means 12.

As shown in FIGS. 1, 3 and 4, as a result of modulating the spatially incoherent light by input image forming means 12, arranged as a bar pattern, the cosine transform of the bar image projected through the system of the invention is configured as a pair of circular zones illustrated as zones or dots 18( see FIG. 4) which correspond to the fundamental spatial frequency of the input light image. These zones or dots appear on the output plane and are equidistantly spaced from the center 20 of output plane 8 on an imaginary straight line 16 extending through center 20. Center 20 lies on axis 14. An important characteristic of the cosine transform is that the position of circular zones 18 is dependent on both the orientation and spatial frequency of the parallel bars forming the graphic bar image. Thus, straight line 16 will always be orthogonal to bars 22 and 24, as depicted by bar 21, forming the graphic bar image as illustrated in FIGS. 1 and 4, and further, the distance 23 between center point 20 and each of dots or circular zones 18 is directly proportional to the fundamental spatial frequency of the graphic bar image. In general, each spatial frequency is inversely proportional to the wavelength of each sinusoidal component of the input image.

In order to further understand the operation of the present invention, the effect, called the Moiré effect, obtained by use of a pair of Fresnel zone plates is first described when the input light from an extended source of spatially incoherent light is not modulated by an input image. Thereafter, the effects of the input image forming means are described. It is necessary to reiterate that, in this discussion, the diffraction effects of the Fresnel zones must be minimized.

A Moiré effect occuring between transforming transparencies or plates 2 and 4, as a result of respective Fresnel zone patterns 26 and 28 thereon, is an essential aspect of the operation of the invention. It is well known that two such transparencies, when placed together in a superimposed fashion but with a center displacement, will produce a visible plane wave "beat" or Moiré pattern which has wave fronts extending orthogonal to the direction of the displacement. The spatial frequency of the Moiré pattern is directly proportional to the center displacement between the superimposed transparencies. Similarly, the same Moiré pattern can be observed by viewing the separated transforming transparencies through a small aperture at and point on output plane 8 other than its center 20. In this case, however, the spatial frequency and the direction of the wave fronts of the visible Moiré pattern are dependent on the amount and direction of the displacement of the observation point relative to center point 20. Otherwise explained, different plane wave "beats" or Moiré patterns will be observed from different observation points.

When rays of incoherent light are directed at transforming transparencies 2 and 4, the light rays passing therethrough are modulated in accordance with the Moiré pattern formed by the two Fresnel zones. Alternately stated, the intensity of light reaching the output plane may be calculated for each light path by multiplying the intensity function of projected light rays taken at the light source by a Moiré pattern transmission coefficient that varies with position.

The total light intensity at any given point on output plane 8 due to all light rays converging at the given point is proportional to the integral of the product of the projected light intensity function and the Moiré pattern transmission coefficient.

When the input light from the light source is modulated by an input image forming means, the total light intensity at any given point on the output plane is proportional to the integral of the product of the input image function and the Moiré pattern transmission coefficient.

The transformation process may be alternately described as follows. When a large zone plate transparency is superimposed at a distance over a smaller zone plate transparency and is transilluminated, then the locus for all possible Moiré pattern loci averages out in summation and will be invisible. The introduction of a parallel line grid anywhere in the converging ray bundle will substract one complenentary Moiré pattern from the field and make the two loci for that particular pattern visible on the transform plane.

A more complete understanding of the invention may be obtained by a mathematical analysis of the device which is designed to operate as close to its geometrical optics limit as is practically possible. In the following analysis the strict hypothetical geometrical optical limit is first assumed and later a rough investigation is made of undesired diffraction effects, which cannot be eliminated from any practical physical embodiment of the invention. The discussion will first deal with the operation of the cosine transformer. The modifications necessary to obtain a sine transformer will then be discussed.

Commencing with the discussion of the cosine transformer with reference to FIG. 5, a displacement prependicular to longitudinal axis 14 is denoted by the two dimensional vector $\underline{r}=(x,y)$. A position on axis 14 is denoted by the scalar coordinate $z$. Thus, the position of a point in three dimensional space is specified by both $\underline{r}$ and $z$. The element of area in a plane perpendicular to the longitudinal axis denoted by $d^2\underline{r}$, where $d^2\underline{r}=dxdy$. A spatial frequency vector will be denoted by the vector $\underline{k}=(p,m)$.

The origin, designated "O," of the coordinate system is placed in the center of lens 6 with the $z$-axis coincident with longitudinal axis 14. The position in any plane perpendicular to the axis is denoted by vector $\underline{r}$. All of the transparencies, for example, input image forming means 12 and transforming Fresnel zone transparencies 2 and 4, in addition to output plane 8, are oriented perpendicular to longitudinal axis 14. The input image forming means placed at $z=-c$, has a transmission coefficient $\rho(\underline{r})$. Transforming transpareties 2 and 4 are respectively placed at $z=-b$ and $z=-a$, and have transmission coefficients of $f(\underline{r})$ and $g(\underline{r})$, respectively. Transform field or output plane 8 is positioned at $z=t$ where $t$ is the focal length of lens 6. The intensity on this plane is denoted by $\sigma(\underline{k})$. On this plane, $\underline{k}$ is proportional to the actual position $\underline{r}$ in a manner to be subsequently determined.

Considering a set of rays converging at the point D in output plane 8, the central ray passing through origin "O" is defined by the vector equation $$\underline{r}=(z/t)\underline{r}_D \qquad (1)$$

where $\underline{r}_D$ is the position of point D on output plane 8. A typical ray passing through a non-central point E on the lens 6 is generally defined by the vector equation $$\underline{r}=(z/t)\underline{r}_D+\underline{s} \text{ where } z\leq 0 \quad (2)$$

which equation is reduced to $\underline{r}=\underline{s}$ in the median plane of lens 6. Such a non-central ray will pass through a point A' on transforming transparency 4 at $$\underline{r}=-(a/t)\underline{r}_D+\underline{s} \quad (3)$$

through a point B' on transforming transparency 2 at $$\underline{r}=-(b/t)\underline{r}_D+\underline{s} \quad (4)$$

and through a point C' on image transparency 12 at $$\underline{r}=-(c/t)\underline{r}_D+\underline{s} \quad (5)$$

Any ray passing through transparencies 4 and 2 and through image forming means 12 will be attenuated by a factor equal to the product of the functions $g$, $f$, and $\rho$ evaluated at respective points A', B', and C'. Summing all rays converging at point D on output plane 8, the light intensity at the point is defined by the expression $$\rho(\underline{r}_D)=\mu\int d^2\underline{s}\,\rho(\underline{r}_{C'})f(\underline{r}_{B'})g(\underline{r}_{A'})$$
$$=\mu\int d^2\underline{s}\,\rho\left(\underline{s}-\frac{c}{t}\underline{r}_D\right)f\left(\underline{s}-\frac{b}{t}\underline{r}_D\right)g\left(\underline{s}-\frac{a}{t}\underline{r}_D\right)$$
$$=\mu\int d^2\underline{r}\,\rho(\underline{r})f\left(\underline{r}+\frac{c-b}{t}\underline{r}_D\right)g\left(\underline{r}+\frac{c-a}{t}\underline{r}_D\right) \quad (6)$$

where $\mu$ is a system parameter proportional to the intensity of the source of diffuse illumination. For the sake of simplicity, the ranges of integration in Equation 6 are assumed to be infinite, but with $\rho(\underline{r})$ vanishing outside of a finite domain.

Assuming that functions $f$ and $g$ correspond to identical Fresnel zone transparencies, in this case transparencies having Fresnel zone patterns thereon functions $f$ and $g$ at corresponding points on transparencies 2 and 4 will be equal. These functions, each of which gives the transmission coefficient as a function of position, may be defined as $$f(\underline{r})=g(\underline{r})=\alpha+\beta\cos\gamma\underline{r}^2 \quad (7)$$

where $\alpha$, $\beta$ and $\gamma$ are constant parameters and where $\underline{r}$ is the magnitude of $\underline{r}$. In order that transmission coefficients $f(\underline{r})$ and $g(\underline{r})$ lie between zero and unity, parameters $\alpha$ and $\beta$ must satisfy the two inequalities $$\alpha+\beta<1 \quad (8)$$

and $$\alpha-\beta>0$$

The multiplier of $\rho(\underline{r})$ in the integrand of the last line of Equation 6 can then be given by $$f\left(\underline{r}+\frac{c-b}{t}\underline{r}_D\right)g\left(\underline{r}+\frac{c-a}{t}\underline{r}_D\right)$$
$$=\alpha^2+\frac{1}{2}\beta^2\cos(\underline{k}\cdot\underline{r}+\delta)+R(r,k) \quad (9)$$

where the spatial frequency vector $\underline{k}$ is related to $\underline{r}_D$ by the expression $$\underline{k}=\frac{2\gamma(b-a)}{t}\underline{r}_D \quad (10)$$

and where the phase shift $\delta$ is given by $$\delta=\frac{2c-b-a}{4\gamma(b-a)}k^2 \quad (11)$$

The remainder term, which may be termed the "Moiré error" and which is assumed to give a negligible contribution to the integral, is given by the expression $$R(\underline{r},\underline{k})=\alpha\beta\left[\cos\gamma\left|\underline{r}+\frac{c-b}{2\gamma(b-a)}\underline{k}\right|^2\right.$$
$$\left.+\cos\gamma\left|\underline{r}+\frac{c-a}{2\gamma(b-a)}\underline{k}\right|^2\right]$$
$$+\frac{1}{2}\beta^2\cos2\gamma\left[r^2+\frac{2c-b-a}{2\gamma(b-a)}\underline{k}\cdot\underline{r}\right.$$
$$\left.+\frac{(c-b)^2+(c-a)^2}{8\gamma^2(b-a)^2}k^2\right] \quad (12)$$

in which $k$ is the magnitude of $\underline{k}$. Inserting Equation 9 into the last line of Equation 6 and neglecting the remainder $R(\underline{r},\underline{k})$, the desired result is obtained $$\sigma(\underline{r})=V\int d^2\underline{r}\,\rho(\underline{r})+W\int d^2\underline{r}\sigma(\underline{r})\cos(\underline{k}\cdot\underline{r}+\delta) \quad (13)$$

in which $\sigma$ is written as a function of $\underline{k}$ instead of $\underline{r}_D$ and the constants, V and W, are given by the expressions $$V=\alpha^2\mu \quad (14)$$
$$W=\frac{1}{2}\beta^2\mu$$

where $\alpha$ and $\beta$ are defined by Equation 7. The domain of integration in Equation 13 can be made effectively finite by requiring $\rho(\underline{r})$ to vanish outside of a finite domain. It is to be noted that the phase shift $\delta$ can be made to vanish if $c=\frac{1}{2}(a+b)$, that is, if the image forming means is placed exactly one-half the distance between identical transforming transparencies 2 and 4.

The sine transformer may be obtained by making rather minor modifications. Initially, it is necessary that functions $f(\underline{r})$ and $g(\underline{r})$ be not identical; specifically, Equations 7 must be replaced by $$f(\underline{r})=\alpha+\beta\cos\gamma r^2 \quad (15)$$

$$g(\underline{r})=\alpha+\beta\sin\gamma r^2 \quad (16)$$

where $\alpha$ and $\beta$ are subject to the same conditions as before.

Structurally, this means that the rings or circles of one of the pair of transforming transparencies 2 or 4 (FIG. 1) must be effectively displaced by 90 degrees. This displacement is illustrated by waveforms $\underline{a}$, $\underline{b}$, and $\underline{c}$ of FIG. 6 which represent the relative transparency of one-half of a Fresnel zone pattern wherein the zero amplitude level is representative of the opaque rings of a Fresnel zone pattern and the unity amplitude level is representative of the transparent rings. If waveform $\underline{a}$ shown in FIG. 6 is assumed to be the reference transforming transparency, then waveform $\underline{b}$ shown in FIG. 6 illustrates a 90 degree displacement which has been provided as shown by increasing the radius of each ring forming the Fresnel zone pattern by an amount equal to one-half the width of the ring. Waveform $\underline{c}$ of FIG. 6 illustrates a 90 degree displacement which has been provided by decreasing the radius of each ring forming the Fresnel zone pattern by an amount equal to one-half the width of the ring.

Resuming the mathematical analysis of the sine transformer, Equation 9 can be replaced by the expression $$f\left(\underline{r}+\frac{c-b}{t}\underline{r}_D\right)g\left(\underline{r}+\frac{c-a}{t}\underline{r}_D\right)$$
$$=\alpha^2+\frac{1}{2}\beta^2\sin(\underline{k}\cdot\underline{r}+\delta)+R'(r,k) \quad (17)$$

where $\underline{k}$ and $\delta$ are defined, as before, by Equations 10 and 11. The remainder term or Moiré error $R'(\underline{r},\underline{k})$ is different in detail from the previous remainder term $R(\underline{r},\underline{k})$ but the qualitative behavior remains the same and hence it need not be discussed further. Neglecting the present remainder term, one then obtains $$\sigma(\underline{k})=V\int d^2\underline{r}\rho(\underline{r})+W\int d^2\underline{r}\rho(\underline{r})\sin(\underline{k}\cdot\underline{r}+\delta) \quad (18)$$

Thus, the substitution of non-identical transparencies having transmission coefficients $f(\underline{r})$ and $g(\underline{r})$ defined by Equation 15 for the identical transparencies defined by Equation 7 will yield the sine transform of $\rho(\underline{r})$.

It is to be noted that the mathematical description above involves Fresnel zone patterns with continuously varying transmission coefficients as given by Equations 7, 15 and 16 whereas the structural description involves Fresnel zone patterns whose transmission coefficients vary discontinuously between zero and one; i.e., they are either totally transparent or opaque at each point. In actual practice, the Moiré patterns produced by each of the types of Fresnel zone patterns are only very slightly different. Consequently, the use of Fresnel zone patterns having transmission coefficients which vary discontinuously gives a good approximation of the idealized cosine or sine transformer described in the mathematical analysis.

Referring once again to FIG. 1, it is understood that it would be within the scope and spirit of the invention to make several modifications in the illustrated system configuration. For example, when input image forming means 12 is embodied as an image transparency, the transparency may be placed between transparencies 2 and 4 or after transparency 4 instead of before transparency 2.

Further, when the use of lens 6 is needed, the focal length of the lens may be so selected as to permit output plane 8 to be placed at any distance whatsoever from the remaining components of the system. Thus, a lens of any focal length may be used, but not being required, as explained above, the lens may be eliminated altogether provided that the Fresnel zone scales of axial aligned transform transparencies 2 and 4 are approprittely sized to allow rays, which are projected towards center 20 of output plane 8, to pass through corresponding points of the respective Fresnel zone patterns 26 and 28. Under such circumstances, the Fresnel zone scales can be sized to permit location of the output plane at any desired distance from the remainder of the system.

Additionally, each of Fresnel zone patterns 26 and 28 may be either positive or negative. A positive Fresnel zone pattern is one having a dark or opaque center whereas a negative pattern has a light or transparent center. The use of two negative Fresnel zone patterns will produce the same results as when two positive Fresnel zone patterns are used. However, the employment of two different Fresnel zone patterns, one negative and one positive, results in a change of sign of the cosine (or sine) transform, i.e., the second term on the right hand side of Equation 13 or 18.

Another modification is that each of the Fresnel zone patterns may be phase-shifted by an arbitrary amount without altering the operation of the device in an essential way. In a mathematical sense, a Fresnel zone pattern may be phase-shifted by making the substitution $$\cos \gamma r^2 \rightarrow \cos (\gamma r^2 + \Psi) \qquad (18a)$$

for $\cos \gamma r^2$ in Equation 7 or in making a similar substitution in Equations 15 and 16 where $\Psi$ is a predetermined angular increment.

To complete the analysis of the invention, it is desirable to consider the undesired diffraction effects and the conditions under which these effects can be neglected. It is assumed that the input transparency is opaque beyond the radius $r=R$ and also that it is bandwidth limited in a spatial frequency sense, namely that the Fourier transform vanishes for $k > k_{max}$. In order that the bandwidth limitation be expressed in a manner invariant to scale change, it is required that $$k_{max} = \frac{2\pi}{R} n_I \qquad (19)$$

where $n_I$ is the number of line pairs, corresponding to $k_{max}$, within the field of view bounded by a circle of radius R. Assuming this same arrangement as that illustrated in FIG. 5, the diffraction from the rings in the neighborhood of $r=R$ on the Fresnel zone plate at $z=-b$ produces a blurring on the output plane characterized by the distance $$d = \frac{1}{\pi} \gamma R (t+b) \lambda \qquad (20)$$

where $\lambda$ is a typical wavelength of light and where $\gamma$ is the constant introduced in Equation 7. It is then required that $d$ be smaller than the fraction $\eta$ times the radius of the circle on the output plane corresponding to $k_{max}$. This implies the inequality $$\frac{4}{\eta}\left[\frac{(t+b)(b-a)}{t^2}\right]\frac{\lambda t}{R^2} n_Z^2 < n_I \qquad (21)$$

where $n_Z (= \gamma R^2/2\pi)$ is the number of concentric rings on the Fresnel zone plate having radii less than R. The requirement above is equivalent to the requirement that the focal length $f_Z (= R^2/2n_Z\lambda)$ of the Fresnel zone plate be much longer than the device, if the points on the output plane corresponding to $k_{max}$ are required to have a radius R. With this last condition, Equation 21 reduces to $$t+b < \eta f_Z \qquad (22)$$

which shows that the lensing action of the Fresnel zone plane is alien to the concept and operation of the present invention.

The making of $n_Z$ arbitrarily small, in order to minimize diffraction effects, leads to large Moiré errors associated with the remainder term $R(\underline{r},\underline{k})$ defined by Equation 12. To take these errors small for the part of the input image between $r=\zeta^{1/2}R$ and $r=R$, the following inequality must be satisfied $$n_I < 2n_Z \zeta^{1/2} \qquad (23)$$

To reduce Moiré errors for the entire input image, one can move it sufficiently far off axis so that there is negligible overlap with the circule defined by $r=\zeta^{1/2}R$. Equivalently, one can move Fresnel zone transparencies 22 and 24 sufficiently far off axis. Thus, there are upper and lower bounds on the choice of $n_Z$; however, arbitrarily small diffraction errors can be achieved without violating the inequality (23) by increasing $R^2/\lambda t$ as much as is practical.

As an example of the use of the present invention, the following parameters may be chosen for illustrative purposes: $n_Z = 250$, $n_I = 50$, R=5 cm., $t=10$ cm., $a=2$ cm., $b=4$ cm., and $\lambda = 5 \times 10^{-5}$ cm., which is a typical wavelength of visible light. If the radius of the output plane=R, then, from Equation 21, $\eta = 0.03$ and $\zeta = 0.01$ where $\zeta$ is the ratio of the diffraction blurring distance to the radius R and $\zeta$ is the fraction of area in the output plane outside of which the error associated with $R(\underline{r},\underline{k})$ is negligible. Also, from the above, $f_Z = 4000$ cm.

A further understanding of the present invention may be obtained by an analysis of the Moiré effect produced by a pair of Fresnel zone patterns to supplement the foregoing mathematical analysis of the optical phenomena.

The scale of a Fresnel zone plate is uniquely defined by the diameter of its center spot, whether light or dark. In the following discussion, the diameter Z of the center spot is generally defined as $$2\sqrt{[n_{min}+1/2)\pi - \psi]/\gamma}$$

where $\Psi$ is defined by Eq. 18a. A first center spot of diameter $Z(Z\cdot\sqrt{n})$ is surrounded by a second ring of diameter $Z\cdot\sqrt{2}$ which in turn is surrounded by a third ring of diameter $Z\cdot\sqrt{3}$ and so on, a typical ring being expressed as $Z\cdot\sqrt{n}$ as stated above. This specific case corresponds to $\Psi = -\pi/2$ shown in Eq. 18a. For convenience, zone plates with center spot diameters of between 2 and 20 mm. are most useful. The outer rings on zone plates with center spots smaller than 2 mm. become very closely spaced and lose their shadowing power by light diffraction. Zone plates with center spots larger than 20 mm. are applicable only to large transformers using very coarse target patterns.

The number of rings on a zone plate has no effect on the performance of the transformer. Additional rings only increase the aperture size and permit the more efficient transformation of larger patterns. Since the spacing and width of the rings become smaller toward the periphery of the plate, a limit on plate size is imposed by diffraction. Thus, to assure satisfactory performance, zone plates used in cosine transformer applications must be fabricated with accuracy and precision.

Figure 7:
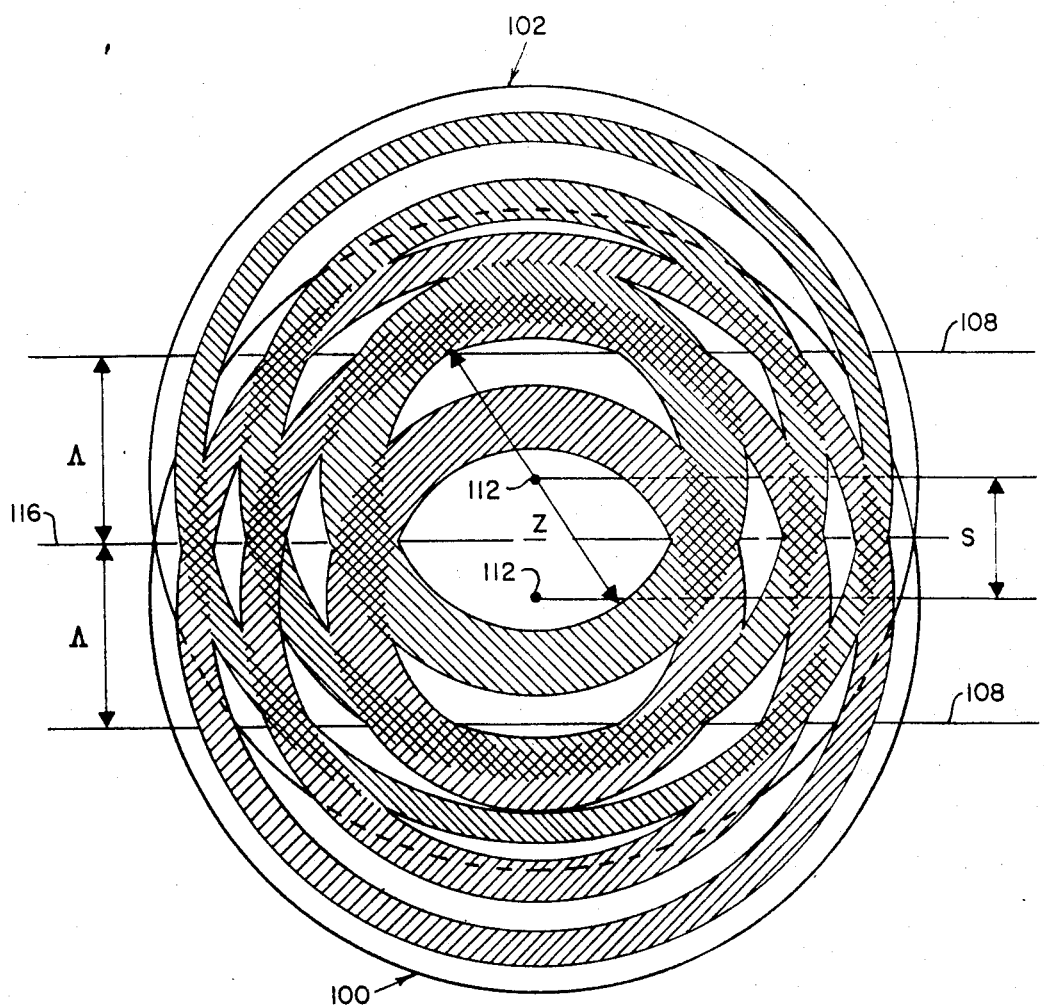
FIG. 7 is a plan view depicting a portion of pair of displaced Fresnel zone patterns of identical polarity.
Figure 8:
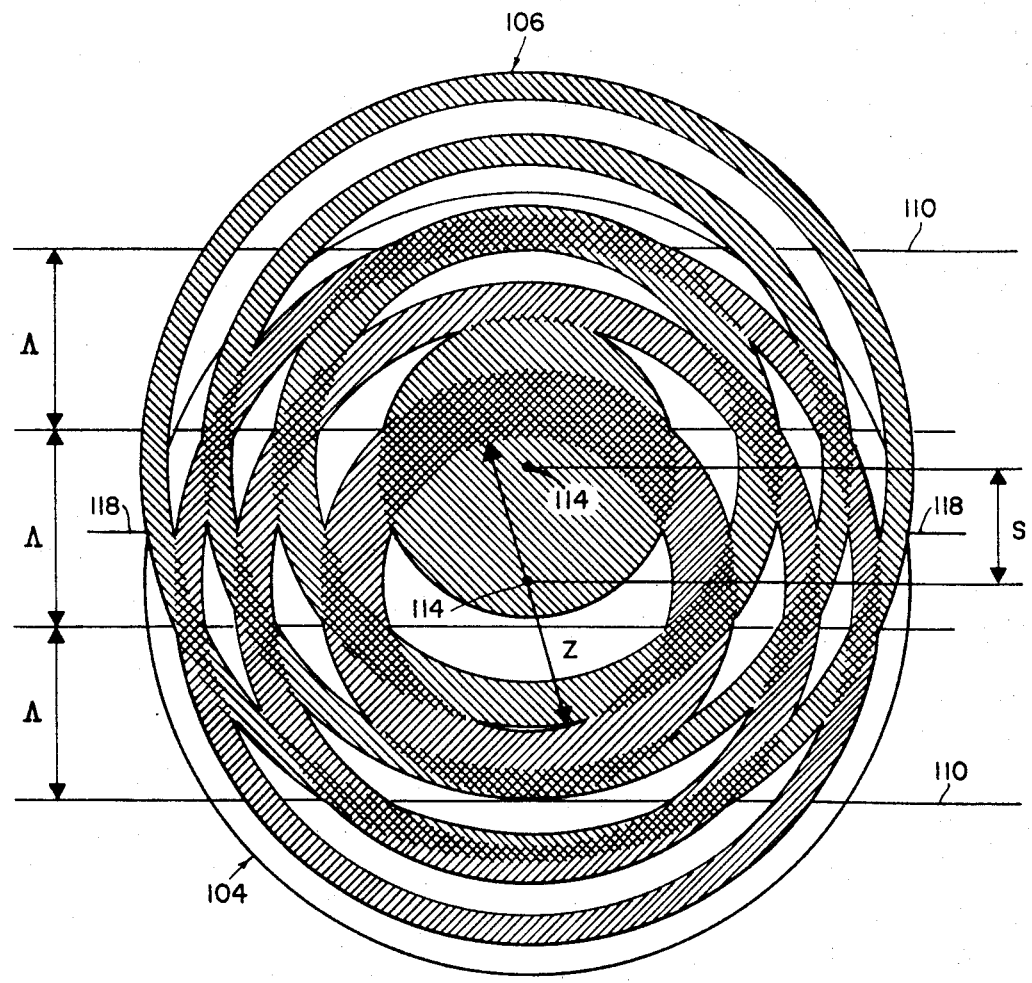
FIG. 8 is a plan view depicting a portion of a pair of displaced Fresnel zone patterns of opposing polarity.

With reference to FIGS. 7 and 8, superimposed zone plates 100, 102 and 104, 106 form a Moiré pattern of parallel lines, indicated by representative lines 108 and 110. A small displacement S between zone plates centers 112 and 114 generates a Moiré pattern of widely spaced parallel lines. The relationship between displacement and line spacing is mathematically expressed as $$S\Lambda = Q_z \quad (24)$$

where $Q_z$ = constant for a particular pair of identical zone plates and $\Lambda$ = wavelength of a Moiré line pattern or target line pattern and equals $2\pi/|k|$.

It can be shown that $$Q_z = \tfrac{1}{4} Z^2 \quad (25)$$

where Z = zone plate scale factor (diameter of center spot in mm.).

By substitution from Eq. 24, the following expression is obtained $$\Lambda = \frac{1}{4} \frac{Z^2}{S} \quad (26)$$

Just as two superimposed zone plates form a Moiré pattern of parallel lines, so does a parallel line pattern superimposed on a zone plate form a Moiré pattern of two symmetrically displaced zone plates of identical scale factor. The displacement of these Moiré zone plates is given by $$S = \frac{1}{4} \frac{Z^2}{\Lambda} \quad (27)$$

The "polarity" of the zone plates, i.e., the opacity or transparency of the center spot, affects the polarity of the generated line pattern. Two plates of identical polarity will project dark lines on light background, while a plate pair of opposing polarity will project light lines on a dark background, as respectively demonstrated by FIG. 7 and FIG. 8. The axis of symmetry 116 between two zone patterns 120 and 122 in FIG. 7 passes through the light area of the Moiré line pattern. In FIG. 8, on the other hand, this axis 118 passes through the dark area of the Moiré line pattern. Alternatively stated, zone plate pairs of opposing polarity generate a spatial frequency which is 180° out of phase when compared with identical plate pairs of equal polarity.

Figure 9:
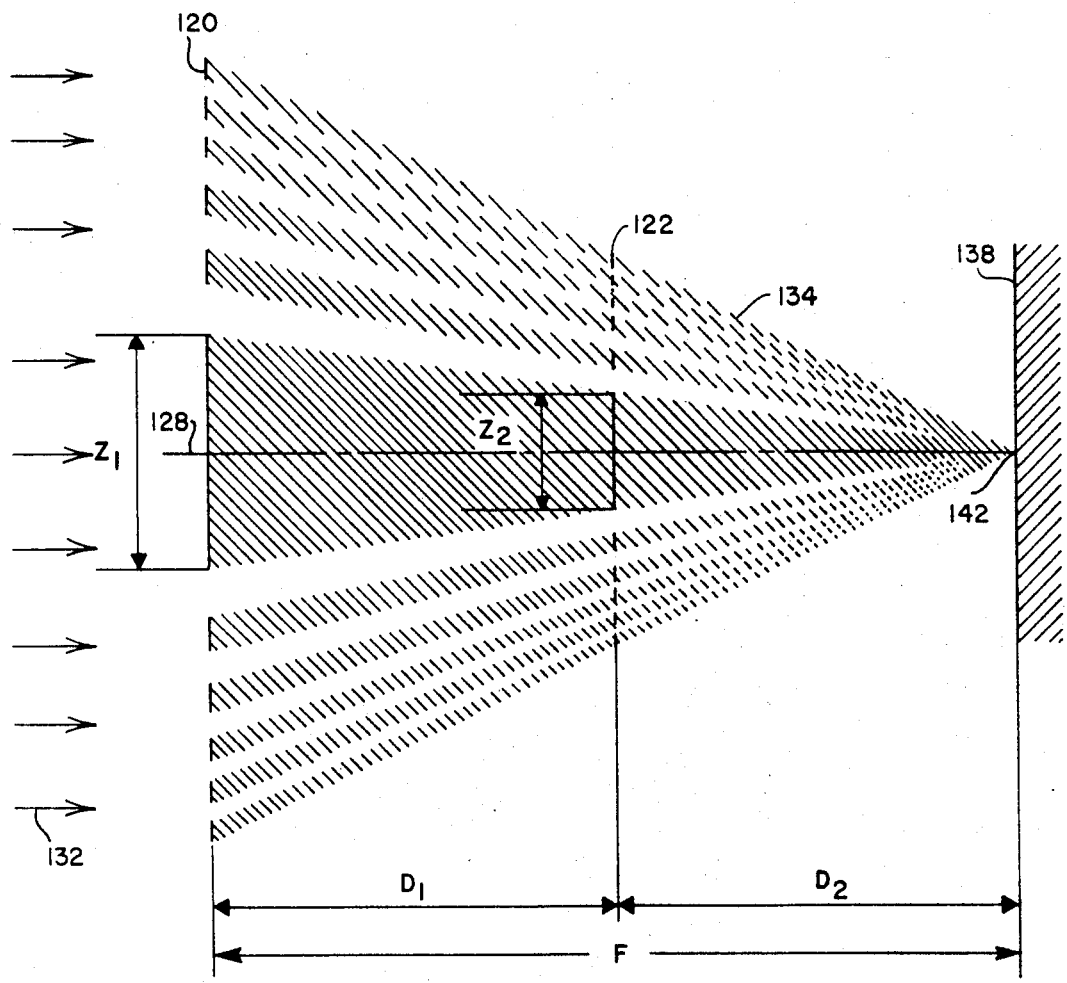
FIGS. 9 and 10 are side views illustrating a pair of differently scaled Fresnel zone patterns to illustrate the zone pattern shadows converging at the pseudo-focal length on a transforms plane without the use of a converging lens, FIG. 9 showing patterns of identical polarity and FIG. 10 showing patterns of opposing polarity.
Figure 10:
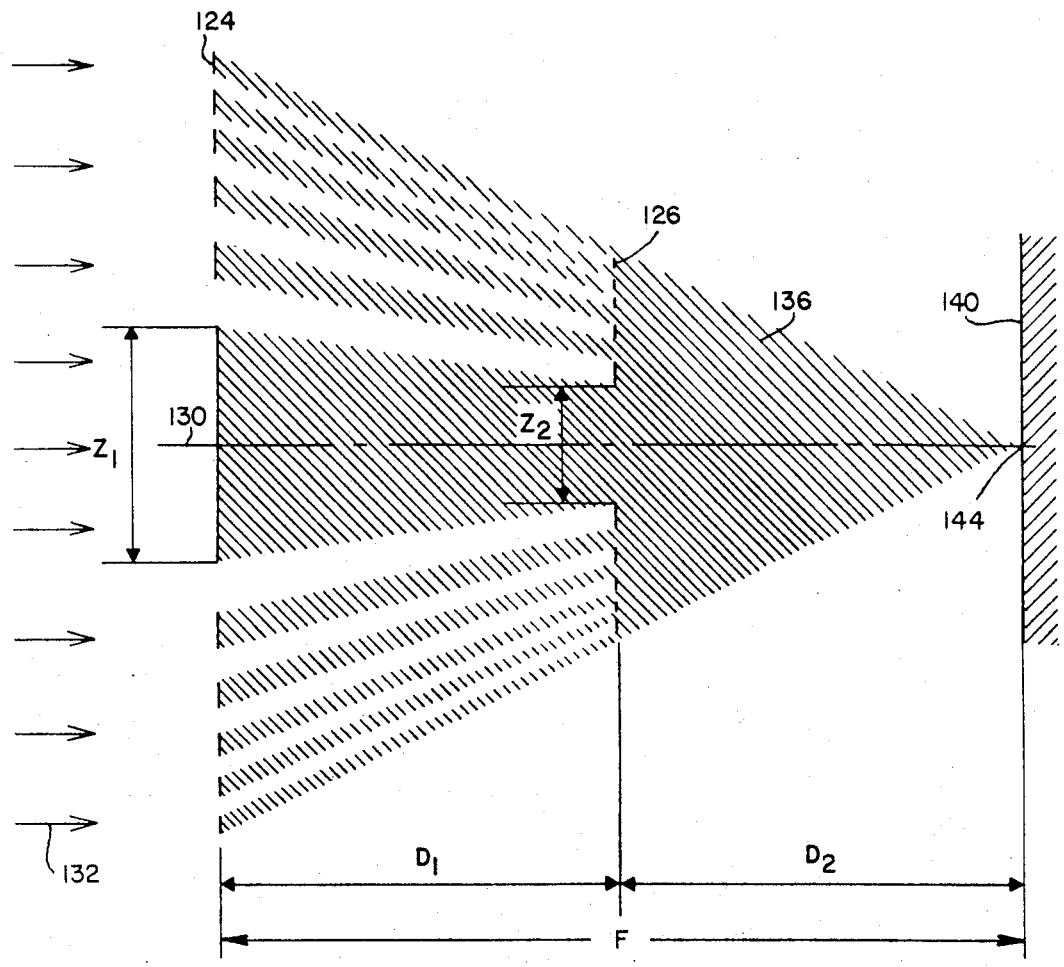

The simplest transformer employs no lenses, as shown in FIGS. 9 and 10. Two separated zone plate transparencies 120 and 122 (FIG. 9) and 124 and 126 (FIG. 10) of different scale factor are aligned on a common optical axis 128 and 130. They are transilluminated along the axis from the larger plate side by a diffuse area light source 132.

Figure 11:
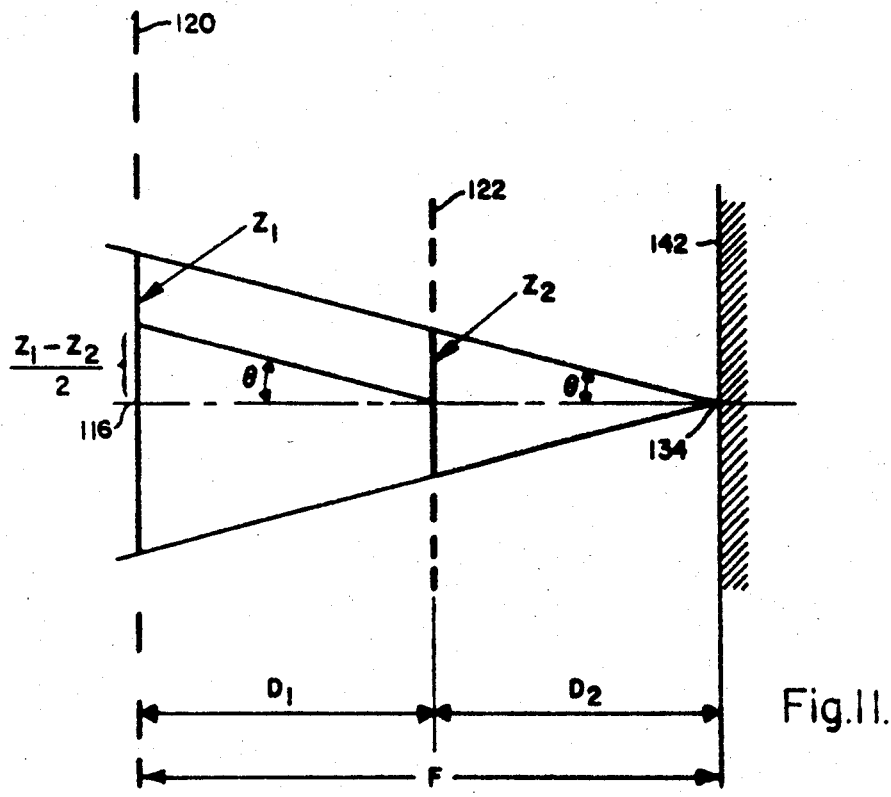
FIG. 11 illustrates a pair of Fresnel zone plates of identical polarity useful as an aid in the description of the optical phenomena of the present invention.

In such an apparatus, the zone plate shadows 134 and 136 converge at a fixed distance, referred to as the pseudo-focal length F, on the optical axis (see FIGS. 9 and 10) at the transform planes 138 and 140. Plates of equal polarity (FIG. 9) will form a light "focal spot" 142 while plates of opposing polarity will form a dark focal spot 144 (FIG. 10). A plane orthogonal to the optical axis and at the distance of the pseudofocal length becomes the transform plane. As shown in FIG. 11, representing the configuration of FIG. 9, for example, the dimensions of such an array are interrelated by $$D_2 = D_1 \frac{Z_2}{(Z_1 - Z_2)} \quad (28)$$

where $D_1$ = distance between the zone plates
$D_2$ = distance between second zone plate and transform plane
$Z_1$ = scale factor of first (larger) zone plate
$Z_2$ = scale factor of second (smaller) zone plate.

The pseudo-focal length F of a zone plate pair is expressed by $$F = D_1 + D_2$$

of from Eq. 28

$$F = D_1 + D_1 \frac{Z_2}{Z_1 - Z_2} \quad (29)$$

and is proportional to the distance between the zone plates and inversely proportional to the difference in scale between the two zone plates.

$$\frac{2D_1}{(Z_1 - Z_2)} = \cot \theta \quad (30)$$

expresses the angle of convergence of the shadow cone where $\theta$ is the half-angle of the cone. Just like the pseudo-focal length, this angle is determined by the scale factor of the two zone plates and the spacing between them. Experimental verification with different zone plates and spacings are shown in Table 1:

TABLE 1
[All dimensions in mm.]

| $Z_1$ | $Z_2$ | $D_1$ | $D_2$ | F | cot θ | 2θ |
|---|---|---|---|---|---|---|
| 9.90 | 7.62 | 100 | 334 | 434 | 21.74 | 5° 16' |
| 9.90 | 7.62 | 90 | 300 | 391 | 19.56 | 5° 52' |
| 9.90 | 7.62 | 80 | 267 | 347 | 17.39 | 6° 34' |
| 9.90 | 7.62 | 70 | 234 | 304 | 15.22 | 7° 32' |
| 9.90 | 7.62 | 60 | 201 | 261 | 13.04 | 8° 46' |
| 7.62 | 5.03 | 51.5 | 100 | 152 | 9.94 | 11° 22' |
| 9.90 | 7.62 | 30 | 100 | 130 | 6.52 | 17° 26' |
| 7.62 | 5.03 | 30 | 58 | 88 | 5.79 | 19° 34' |
| 11.18 | 7.62 | 30 | 64 | 94 | 4.21 | 26° 42' |
| 11.18 | 3.96 | 59 | 32 | 91 | 4.00 | 27° 28' |
| 9.90 | 5.03 | 30 | 31 | 61 | 3.08 | 35° 58' |
| 11.18 | 3.96 | 31 | 16 | 47 | 2.15 | 49° 52' |

Figure 12:
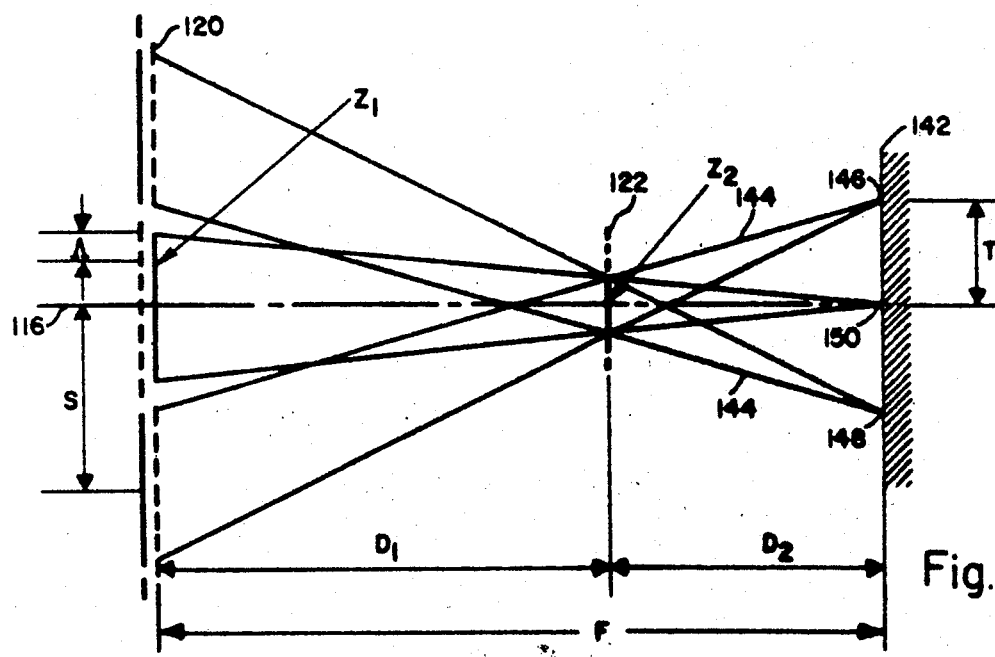
FIG. 12 is similar to the illustration of FIG. 11 with an input image added thereto as a further aid in the description of the present invention.

Referring to FIG. 12, by superimposing a parallel line pattern code or target on first zone plate 120, two new "Moiré zone plates" are formed. These Moiré plates form two displaced shadow cones 144 which converge at spots 146 and 148 on transform plane 142. The lateral distance of these spots from center point 150 at the intersection of plane 142 and axis 116 of the array is proportional to the spatial frequency of the line pattern generating them. A higher spatial frequency of the line pattern causes a larger displacement of the Moiré zone plates which in turn cause a larger displacement of the shadow cones or transform spots.

If $\Lambda$ is the wavelength of the parallel line code or target pattern placed in contact with the front (larger) zone plate, then, with the aid of FIG. 12, $$T = S \frac{D_2}{D_1} \quad (31)$$

where T = lateral spacing between the transform spot and axis, where T is the scalar of the vector $r_D$.

Thus, by substitution from Equations 27 and 28, $$T = \frac{1}{\Lambda} \frac{Z_1^2 Z_2}{4(Z_1 - Z_2)} \quad (32)$$

or, since the spatial frequency of the line pattern is $$k/2\pi = 1/\Lambda \tag{33}$$

the lateral spacing can be expressed as $$T = \frac{K}{2\pi} \frac{Z_1 Z_2}{4\left(1-\frac{Z_2}{Z_1}\right)} \tag{34}$$

or $$T = \frac{k}{2\pi} Q_T$$

where $$\frac{k}{2\pi} = \text{spatial frequency of target pattern}$$

and $$Q_T = \frac{Z_1 Z_2}{4\left(1-\frac{Z_2}{Z_1}\right)} \tag{35}$$

is the transfor constant for $Z_1 > Z_2$.

This constant is independent of the spacing $D_1$ between the zone plates as experimentally verified and shown by Table 2. It can be shown that in the general case $$Q_T = \frac{\pi t}{b-a}$$

TABLE 2

| $Z_1$ | $Z_2$ | $D_1$ | $D_2$ | $D_3$ | $F$ | $\cot\theta$ | $2\theta$ | $\Lambda$ | $\frac{k}{2\pi}$ | $T$ | $Q_T$ |
|---|---|---|---|---|---|---|---|---|---|---|---|
| 9.90 | 7.62 | 100 | 334 | 0 | 434 | 21.74 | 5° 16' | 10.6 | .09 | 7.5 | 83 |
|  |  |  |  |  |  |  |  | 5.4 | .18 | 15 | 83 |
|  |  |  |  |  |  |  |  | 3.7 | .26 | 22 | 83 |
|  |  |  |  |  |  |  |  | 3.2 | .31 | 26 | 83 |
|  |  |  |  |  |  |  |  | 1.6 | .63 | 52 | 83 |
| 9.90 | 7.62 | 29 | 106 | 0 | 135 | 6.36 | 17° 52' | 10.6 | .09 | 7.5 | 83 |
|  |  |  |  |  |  |  |  | 5.4 | .18 | 15 | 83 |
|  |  |  |  |  |  |  |  | 3.7 | .26 | 22 | 83 |
|  |  |  |  |  |  |  |  | 3.2 | .31 | 26 | 83 |
|  |  |  |  |  |  |  |  | 1.6 | .63 | 52 | 83 |

Here, the same zone plate pair was used at two different spacings (100 and 29 mm.) but had the same transform constant of 83. Exchanging the first zone plate with a coarser one and the second with a finer one, new values for $Q_T$ are obtained as shown in Table 3.

TABLE 3

| $Z_1$ | $Z_2$ | $D_1$ | $D_2$ | $D_3$ | $F$ | $\cot\theta$ | $2\theta$ | $\Lambda$ | $\frac{k}{2\pi}$ | $T$ | $Q_T$ |
|---|---|---|---|---|---|---|---|---|---|---|---|
| 11.18 | 7.62 | 100 | 205 | 0 | 305 | 14.04 | 8° 8' | 10.6 | .09 | 6 | 67 |
|  |  |  |  |  |  |  |  | 5.4 | .18 | 12 | 67 |
|  |  |  |  |  |  |  |  | 3.7 | .27 | 18 | 67 |
|  |  |  |  |  |  |  |  | 3.2 | .31 | 21 | 67 |
|  |  |  |  |  |  |  |  | 1.6 | .62 | 42 | 67 |
| 11.18 | 3.96 | 59 | 34 | 0 | 83 | 4.08 | 27° 32' | 10.6 | .09 | 1.5 | 17 |
|  |  |  |  |  |  |  |  | 5.4 | .18 | 3.1 | 17 |
|  |  |  |  |  |  |  |  | 3.2 | .31 | 5.3 | 17 |
|  |  |  |  |  |  |  |  | 1.6 | .62 | 10.5 | 17 |

Figure 13:
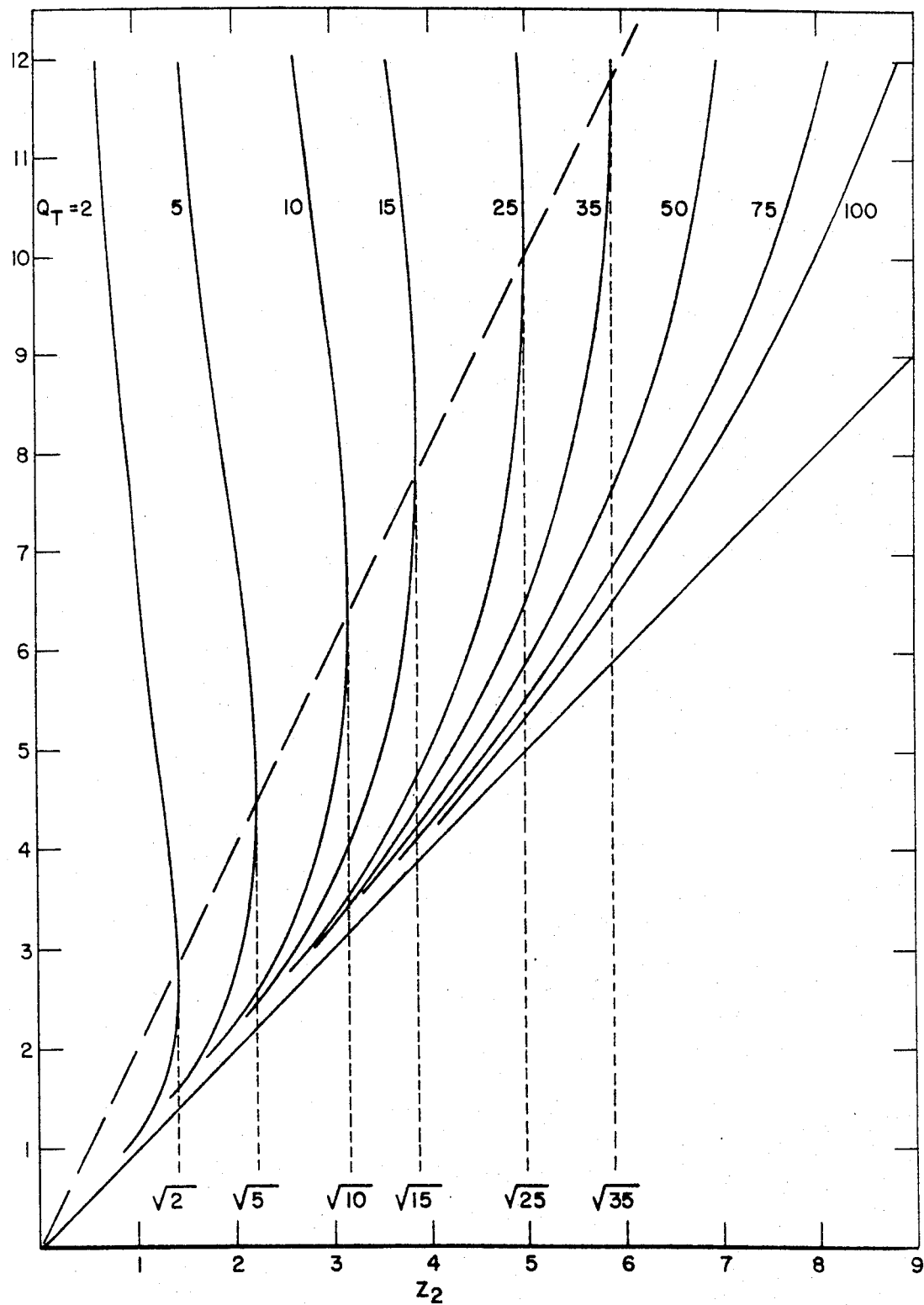
FIG. 13 is a plot of the several transform constants ($Q_T$) for a plurality of Fresnel zone patterns.

FIG. 13 is a plot of $Q_T$ as a function of different zone plate pairs. It shows that the transform constant goes to infinity when the two zone plates have equal scale factors. By differentiation and from this table, it can also be shown that $Q_T$ is minimum when $$Z_1 = 2Z_2 \tag{36}$$

and $$Q_T = Z_2^2 \tag{37}$$

Moving the transparent bar pattern target along the axis of the transformer has the same effect as changing the spatial frequency of the bar pattern. Or alternately, the virtual zone plate which is projected into the plane of the bar pattern is scaled up or down, proportional to the distance $D_3$.

Figure 14:
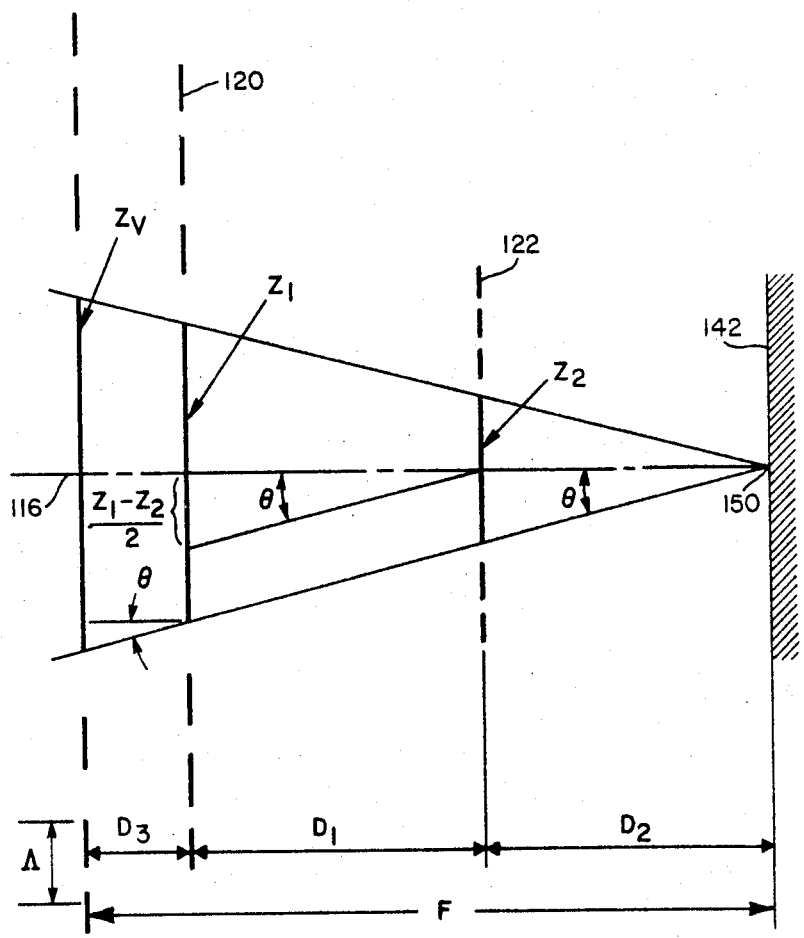
FIG. 14 is a view similar to that of FIG. 12 further useful in describing the present invention.

Referring to FIG. 14, $$\frac{Z_V}{2(D_1+D_2+D_3)} = \frac{Z_1}{2(D_1+D_2)}$$

$$Z_V = Z_1 \frac{(D_1+D_2+D_3)}{(D_1+D_2)}$$

$$Z_V = Z_1 \frac{F+D_3}{F} \tag{38}$$

$Z_V$=scale factor of virtual zone plate in plane of target bar pattern.

By substituting $Z_V$ for $Z_1$ in Eq. 35, a new $Q_T$ is obtained for the transformer:

$$Q_{TV} = Q_T \frac{Z_V Z_2}{4\left(1-\frac{Z_2}{Z_V}\right)} \tag{39}$$

or from Eq. 38.

$$Q_{TV} = \frac{Z_1 Z_2 (F+D_3)}{4F\left(1-\frac{Z_2 F}{Z_1(F+D_3)}\right)} \text{ for } D_3 > -F \tag{40}$$

where $Q_{TV}$=transform constant for virtual zone plate, or real target pattern, at distance $D_3$ from $Z_1$.

Referring to FIG. 14 and Eqs. 36 and 37, $Q_{TV}$ is minimum when $$Z_V = 2Z_2 = 2\sqrt{Q_T}$$

or $$D_1 + D_3 = D_2$$

or $$F = 2D_2$$

Experimental data of Table 4 show the effects of moving a bar pattern of fixed spatial frequency along the axis of the transformer. It proves that the virtual spatial frequency displayed by the transform spots increases with distance from the transform plane and is valid even when the target bar pattern is placed inside the transformer ($D_3$ is negative). This table also shows that the minimum transform constant is at the distance $2D_2$ where $Q_T$ becomes $Z_2^2$.

TABLE 4

| $Z_1$ | $Z_2$ | $D_1$ | $D_2$ | $F$ | $\cot\theta$ | $2\theta$ | $D_3$ | $\Lambda$ | $T$ | $Q_T$ | $\frac{K_V}{2\pi}$ |
|---|---|---|---|---|---|---|---|---|---|---|---|
| 9.90 | 7.62 | 100 | 334 | 434 | 21.74 | 5° 16' | −50 | .18 | 14 | 128 | .11 |
|  |  |  |  |  |  |  | 0 | .18 | 15 | 83 | .18 |
|  |  |  |  |  |  |  | +50 | .18 | 16 | 68 | .23 |
|  |  |  |  |  |  |  | 100 | .18 | 18.5 | 62 | .30 |
|  |  |  |  |  |  |  | 200 | .18 | 22 | 1 58.2 | .38 |
|  |  |  |  |  |  |  | 234 | --- | --- | --- | --- |
|  |  |  |  |  |  |  | 300 | .18 | 25.5 | 58.5 | .44 |
| 11.18 | 7.62 | 100 | 205 | 305 | 14.04 | 8° 8' | −50 | .18 | 10.5 | 96 | .11 |
|  |  |  |  |  |  |  | 0 | .18 | 12.0 | 67 | .18 |
|  |  |  |  |  |  |  | +50 | .18 | 13.0 | 60 | .22 |
|  |  |  |  |  |  |  | 100 | .18 | 16.5 | 1 58.1 | .28 |
|  |  |  |  |  |  |  | 105 | --- | --- | --- | --- |
|  |  |  |  |  |  |  | 200 | .18 | 20.0 | 60 | .33 |
|  |  |  |  |  |  |  | 300 | .18 | 24.0 | 64 | .375 |

1 58.06 minimum $Q_T$.

Equation 35 shows that identical zone plates will have an infinite $Q_T$. Such a combination will, therefore, be unable to transform patterns. Inclusion of a positive lens in the transformer array, as shown schematically in FIG. 15, produces convergence of the ray bundles and image transformation.

Geometric optics state that two equal zone plates 152 ($Z_{02}$) and 154 ($Z_{01}$) located on the optical axis 156 of a positive lens 158 at a distance $Y_1$ and $Y_2$ will project two inverted real zone plate images 150 and 162 of different scale $Z_1$ and $Z_2$.

Looking toward the light source 164 from the focal spot 166, the observer will see two erect virtual images $Z_{1V}$ and $Z_{2V}$ of different scale. By placing the transform plane 168 at $f_1$, the images placed in front of the plane can be transformed.

Figure 15:
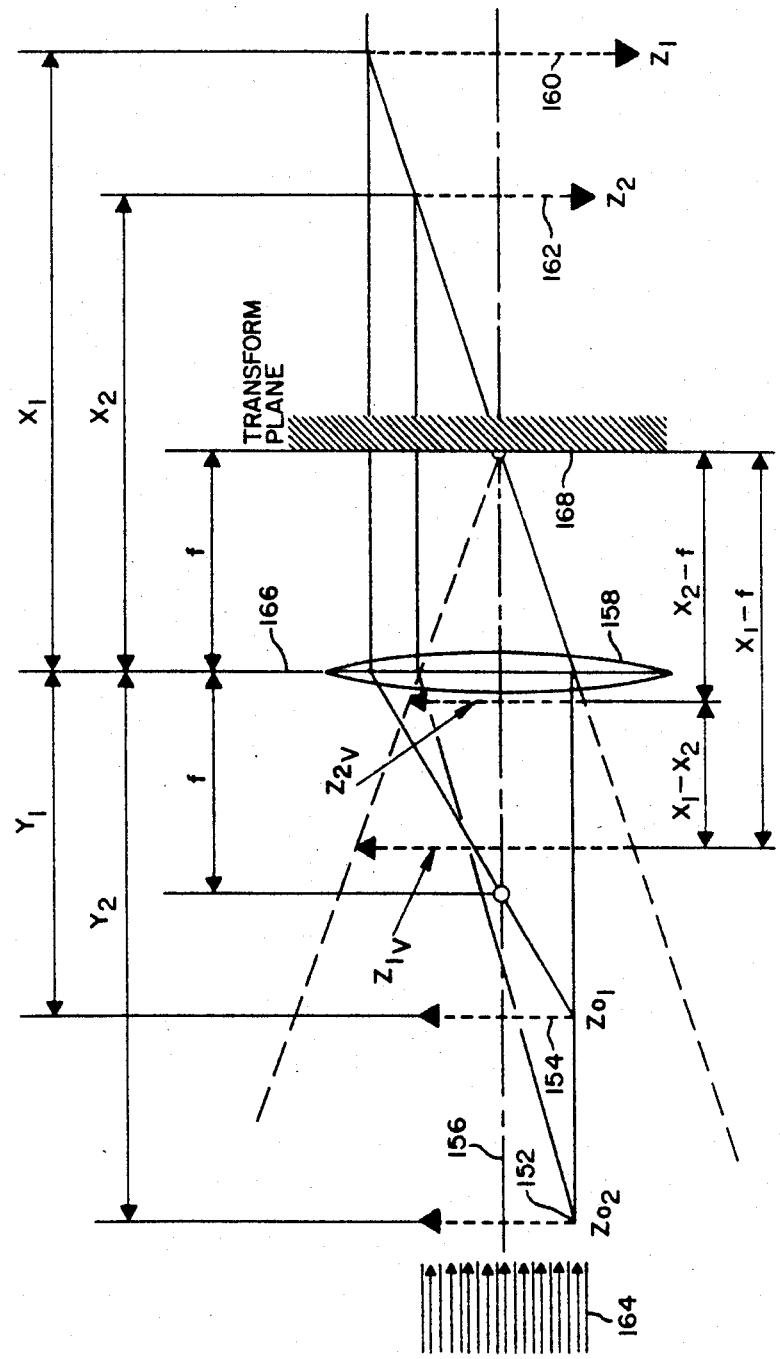
FIG. 15 is a view of a pair of identically scaled Fresnel zone patterns of identical polarity, an input image and a converging lens which is useful to aid in the description of the present invention.

Referring to FIG. 15, thin lens laws state $$\frac{1}{X_1} = \frac{1}{f} - \frac{1}{Y_1}$$

$$\frac{1}{X_2} = \frac{1}{f} - \frac{1}{Y_2}$$

and $$Z_1 (\text{or } Z_{1V}) = \frac{Z_0}{(Y_1/f) - 1}$$

$$Z_2 (\text{or } Z_{2V}) = \frac{Z_0}{(Y_2/f) - 1}$$

where $Z_0$ = scale factor of identical real zone plate objects
$Z_1$ = scale factor of first (larger) projected real zone plate image
$Z_2$ = scale factor of second (smaller) projected real zone plate image
$Z_{1V}$ = scale factor of first (larger) virtual zone plate image
$Z_{2V}$ = scale factor of second (smaller) virtual zone plate image
$Y_1, Y_2$ = lens to object distances
$X_1, X_2$ = lens to image distances.

Also, $f$ = focal length of lens
$D_1 = X_1 - X_2$
$D_2 = X_2 - F$
$F = X_1 - F$.

By selecting $Z_0$, $f$, $Y_1$ and $Y_2$, it is possible to form any desired virtual zone plate pair from two identical zone plates.

The transform constant of such an array is $$Q_T = \frac{Z_0^2}{4uv\left(1 - \frac{a}{b}\right)}$$

where $$u = \frac{Y_1}{f} - 1$$

$$v = \frac{Y_2}{f} - 1$$

Contrary to Eq. 35, this configuration is sensitive to the individual zone plate location.

If the spacing between the identical zone plates is kept fixed, then the transform constant remains fixed regardless of the distance of the plate pair from the lens. Under these conditions, $Z_{1V}$ and $Z_{2V}$ are scaled up or down by the identical magnification ratio, and the ray bundles of the virtual zone plate images converge at the (constant) focal-transform plane of the lens.

Pattern targets introduced anywhere on the object side of the lens will have a fixed $Q_T$, while those inserted between the lens and the transform plane will be transformed with a $Q_T$ which goes to zero as the pattern approaches the transform plane. Table 5 shows experimental verification data.

TABLE 5

| $Z_0$ | $Y_2$ | $f$ | $\Lambda$ | $\frac{k}{2\pi}$ | Lens to target | $Y_2-Y_1$ | $T$ | $\frac{Q_T}{2}$ |
|---|---|---|---|---|---|---|---|---|
| 9.90 | 230 | 214 | 3.1 | .315 | 650 | 165 | 10 | 3 |
| 9.90 | 230 | 214 | 3.1 | .315 | 270 | 165 | 10 | 32 |
| 9.90 | 700 | 214 | 3.1 | .315 | 965 | 165 | 10 | 32 |
| 9.90 | 700 | 214 | 5.4 | .186 | 965 | 165 | 6 | 32 |
| 9.90 | 700 | 214 | 5.4 | .186 | 50 | 165 | 6 | 32 |
| 9.90 | 100 | 214 | 5.4 | .186 | 50 | 67 | 15 | 81 |
| 9.90 | 100 | 214 | 5.4 | .186 | 200 | 67 | 15 | 81 |
| 9.90 | 100 | 214 | 5.4 | .186 | 400 | 67 | 15 | 81 |
| 9.90 | 150 | 214 | 5.4 | .186 | 350 | 128 | 7.5 | 40 |
| 9.90 | 250 | 214 | 5.4 | .186 | 350 | 196 | 5 | 27 |
| 9.90 | 250 | 214 | 3.1 | .315 | 350 | 196 | 8.5 | 27 |

It is possible to combine the lensless and the focusing transformer by placing a telescope lens in front of a transformer with two different zone plates. Alternately, the lens can be located between the different zone plates to obtain telescopic magnification.

These alternate configurations permit close spacing of the optical elements of lens, zone plates and transform plane but are very sensitive to minor optical aberrations in the elements.

In all transformer applications the target pattern can contain many superimposed spatial frequencies at different orientations. Only target opacity and Moiré interference limit the number of allowable superimpositions. In all configurations the target pattern can be emissive (in the form of patterned light sources) or reflective (in the form of patterned reflectors) in addition to the transparencies described here. In these cases, the code or target pattern must be placed on the side of both zone plates opposite the transform plane.

While preferred embodiments of the present invention have been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. An optical transformer apparatus comprising:
    an output plane;
    an extended source of spatially incoherent light propagating towards said output plane;
    input impage forming means optically positioned between said output plane and said source for producing an input image signal of the spatially incoherent light upon illumination of said input image-forming means by the spatially incoherent light;
    a pair of Fresnel zone patterns optically positioned between said output plane and said source for propagation therethrough of the spatially incoherent light, said Fresnel zone patterns each including a plurality of concentric circles having a coarseness sufficient, when the spatially incoherent light is propagated through both said patterns, to produce identifiable light signals corresponding to optical Fourier sine and cosine transforms with minimum diffraction, in accordance with the inequality $$n_I > \frac{4}{\eta}\left[\frac{(t+b)(b-a)}{t^2}\right]\frac{\lambda t}{R^2} n_z^2$$

where $n_I$ is the number of resolvable line pairs in the input image signals, $\eta$ is the ratio of the diffraction blurring distance to a radius of a circle on said output plane corresponding to the point where the Fourier transform signal varnishes, $t$ is the focal distance from said patterns to said output plane, $(t+b)$ is the distance from a first of said patterns to said output plane, $(b-a)$ is the distance between said patterns, $\lambda$ is the typical wavelength of the spatially incoherent light, R is the radius of the input image signal, and $n_z$ is the number of concentric rings on each of said patterns having radii less than R;
    whereby the spatially incoherent light as modulated by said input image forming means is transformed to produce the identifiable light signals corresponding to the optical Fourier transforms in said output plane.

2. The apparatus defined by claim 1 wherein said patterns for forming Fourier transforms of the light images comprises two transparencies situated parallel to each other and arranged as transparent and opaque areas.

3. The apparatus defined by claim 2 wherein said two transparencies are flat.

4. The apparatus defined by claim 2 wherein said output plane and said two transparencies are mutually parallel and aligned along a common axis, the axis passing through the path and placed orthogonally to said output plane and to said two transparencies and extending through the center of said patterns on each of said two transparencies.

5. The apparatus defined by claim 4 including a converging lens aligned on the common axis between said output plane and said two transparencies and said output plane positioned at the focal point of said lens.

6. The apparatus defined by claim 4 wherein said pattern on said transparency further from said output plane is scaled larger than said pattern on said transparency nearest to said output plane and wherein said output plane is positioned at a distance from said transparencies where the light signals passing through corresponding rings of said patterns converge.

7. The apparatus defined by claim 2 wherein each of said patterns on each of said two transparencies is maintained in axial alignment relative to the other on a single axis passing through the path extending through the center of each of said patterns.

8. An optical transformer for producing identifiable sine and cosine transforms of modulated diffuse, spatially incoherent light in an output plane comprising means for propagating the modulated diffuse, spatially incoherent light towards the output plane, a first element having a Fresnel zone pattern thereon, a second element having a Fresnel zone pattern thereon, said Fresnel zone patterns having a construction such that said patterns negligibly diffract the spatially incoherent light, said first and second elements positioned between said means and the output plane for producing the identifiable transforms of the modulated diffuse, spatially incoherent light.

9. An optical transform as in claim 8 further including input image forming means for modulating the diffuse, spatially incoherent light.

10. A transformer as in claim 8 wherein said Fresnel zone pattern construction is such as to provide a focal length greater than the distance between said first and second elements, respectively and the output plane.

11. A transformer as in claim 10 wherein the focal length of said Fresnel zone patterns is related to the distance between said first and second elements and the output plane in accordance with the inequality $$f_z > \frac{1}{\eta}(t+b)$$

where $f_z$ is the focal length, $\eta$ is the ratio of the diffraction blurring distance of said patterns to a radius of a circle on the output plane corresponding to the point where the identifiable transforms vanish, and $(t+b)$ is the distance from one of said patterns to the output plane.

12. A transformer as in claim 8 wherein the Moiré errors of said Fresnel zone patterns is minimized in accordance with the inequality $n_I < 2 n_Z \zeta^{\frac{1}{2}}$ where $n_I$ is the number of resoluable line pairs in the modulated, diffuse, spatially incoherent light, $n_Z$ is the number of concentric rings on each of said patterns having radii less than the radius of the signal modulating the modulated, diffuse, spatially incoherent light, and $\zeta$ is the fraction of area in the output plane outside of which the error associated with the Moiré is negligible.

13. An optical transformer comprising:
an output plane;
an extended source of spatially incoherent light propagating towards said output plane;
input image forming means optically positioned between said output plane and said source for modulating the spatially incoherent light to produce input image signals;
a pair of Fresnel zone patterns optically positioned between said output plane and said source and in the optical path of the input image signals for propagation thereof through said zone patterns, said zone patterns having a focal length extending beyond said output plane at a distance sufficient to enable formation of detectable optical signals on said output plane corresponding to the individual sine and cosine optical Fourier transforms of the input image signals upon passage thereof through said Fresnel zone patterns.

References Cited
UNITED STATES PATENTS 3,402,001    8/1968    Fleisher          350—162 ZP

OTHER REFERENCES

Oster et al., Scientific American, vol. 211, May 1963, pp. 54–63.

Oster et al., Jour. of the Optical Society of America, vol. 54, No. 2, February 1964, pp. 169–175.

Stecher, American Journal of Physics, vol. 32, No. 4, April 1964, pp. 247–257.

Meyer, "The Diffraction of Light, X-rays and Material Particles," J. W. Edwards, publisher, 1949, p. 32.

DAVID SCHONBERG, Primary Examiner

R. J. STERN, Assistant Examiner

U.S. Cl. X.R.

250—237 G; 350—162 ZP, 321